United States Patent [19]

Ericksen

[11] Patent Number: 5,064,319

[45] Date of Patent: Nov. 12, 1991

[54] HARDWARE INSTALLATION TOOL

[76] Inventor: Colin W. Ericksen, 13428 The Square, Poway, Calif. 92064

[21] Appl. No.: 663,554

[22] Filed: Mar. 4, 1991

[51] Int. Cl.⁵ ............................................. B23B 47/28
[52] U.S. Cl. ................................ 408/115 R; 408/72 R
[58] Field of Search ............ 408/115 R, 115 B, 72 B, 408/88, 97, 72 R; 33/667, 638, 644

[56] References Cited

U.S. PATENT DOCUMENTS

| 310,710 | 1/1885 | Nichols | 408/97 |
| 1,984,387 | 12/1934 | Turner | 408/115 R |
| 2,560,382 | 7/1951 | Barr | 408/97 |

FOREIGN PATENT DOCUMENTS

| 858923 | 10/1952 | Fed. Rep. of Germany ... 408/115 R |
| 433314 | 4/1948 | Italy ................................. 408/115 R |
| 1152720 | 4/1985 | U.S.S.R. .......................... 408/115 R |
| 558413 | 1/1944 | United Kingdom ............ 408/115 R |

Primary Examiner—Daniel W. Howell

[57] ABSTRACT

The present invention is a device for locating fastener positions and is more particularly concerned with the aspect of precise location for removal of material by boring or drilling by means of a handheld electric power tool.

2 Claims, 3 Drawing Sheets

HARDWARE INSTALLATION TOOL

FIELD OF THE INVENTION

This invention relates to cabinetry and arose from the need for precise location of pilot holes that can be varied to the requirements of the user.

DISCUSSION OF PRIOR ART

Current methods for hardware installation include large machinery called line boring machines and manual drilling jigs. The line boring machines drill a series of pilot holes equally spaced apart in a single operation. The very expensive and sophisticated machines can locate pilot holes in both a vertical and horizontal plane at one time but the spacing between the pilot hole is not adjustable. They are beyond the financial means of most users and are not portable. The manual drilling jigs, locate for a series of holes equally spaced apart, usually 32 mm on center. These devices cannot locate for pilot holes in a vertical and horizontal plane other than equal spacing. Hardware that is not manufactured for use on this equal pilot hole spacing system, cannot be used with any of the above devices. To overcome the disadvantages of existing methods, the present invention is developed to produce an effective system that is adjustable for, hole locations to accurately drill material to receive cabinetry hardware for varying material thicknesses.

SUMMARY OF THE INVENTION

The present invention is a hardware installation tool that can be used with a portable electric drill motor.

An object of the invention is two parallel channel rail members, having connecting fastener holes at each end.

Another object of the invention is the separation of the rail members by a spacer at one end and a footpiece on the opposite end.

A further object of the invention is the channel rail members face each other's open side.

A still further object of the invention is attachment of the rail members, spacer and footpiece by fasteners, forming a closed raceway guide.

Another object of the invention is washers held within the raceway guide. A further object of the invention is that the footpiece acts as a positioning means to position the guide rails on a workpiece.

A still further object of the invention is templates constructed of a material thickness that can pass between the guide rail members.

Another object of the invention is threaded holes on the edges of the templates that pass between the guide rails.

A further object of the invention is the washers captured within the guide rails act as an abutment stop to the templates.

A still further object of the invention is the intermittent clamping of the templates to the guide rails with a thumbscrew's stud passing through the captured washer and threaded into the template, securing the template to the guide rail wall.

Another object of the invention is reference lines on the templates, for elevation positioning.

A still further object of the invention is a threaded hole on more than one edge of the templates so the templates can be rotated and attached to the guide rails to reposition pilot holes for different uses.

Another object of the invention is identifying marks on each facet of the faceframe mounting plate template having fixed guide holes.

A further object of the invention is the provision of guide slots in the templates.

A still further object of the invention is that the pilot hole locating bushing is constructed by two identical parts placed one on each side of the slot of a given template.

Another object of the invention is the securing of the pilot hole bushing to the slotted template with fastener.

A further object of the invention is the head of the fasteners and the nut of the fasteners, recesses into the formed channel of the pilot hole bushing, providing a cradle to stabilize a vix bit drilling tool.

A still further object of the invention is a reference line on the pilot hole bushing.

Another object of the invention is a V notch on the edges of the hinge plate locating template, providing a declining diameter positioning means. The V notch is positioned onto the arm of a previously installed concealed hinge to match the template spacing to the door hinge placement. This allows the template to be set to any concealed hinge regardless of the hinge cup diameter.

A further object of the invention is a drawer guide pilot hole locating template, with provided slots and adjustable pilot hole locating bushings.

A still further object of the invention is the adjustable drill guide locating bushing can be set to the attachment hole spacing of most any type of drawer guide.

Another object of the invention is an adjustable shelf support pin locating template, with provided slots and adjustable drill guide bushings, allowing for varying the center to center spacing of support pin locations.

A further object of the invention is that all templates can be preset to given positions to work in unison creating a hardware installation system, using different types and brands of hardware.

A still further object of the invention is a line boring capability formed by setting all templates to rest against each other and adjusting the drill guide bushing to line up and be equally spaced apart.

Another object of the invention is all pilot hole drill guide bushings are to be used with vix bit drilling tools.

A further object of the invention is the 7/64" vix bit is suitable for wood screw pilot holes and a 13/64" vix bit provides pilot holes for European system screw attachment and a proper size pilot hole for a 5 mm adjustable shelf pin. The adjustable drill guide bushing is designed to accommodate both sizes of vix bits.

Another object of the invention is that the adjustable drill guide bushing is centered in the drawer guide locating template the proper distance so the entire tool can be inverted and the drawer guide locating template can act as the positioning foot. This establishes the elevation of the adjustable drill guide bushing for pilot holes to install standard European style drawer guides.

A further object of the invention is that all templates will function properly in an inverted position.

A still further object of the invention is that all templates function properly in right hand or left hand positioning.

Another object of the invention is the guide channel members form an abutment stop when the tool is placed against a cabinet partition or face frame.

A further object of the invention is the ends of the guide channel members act as an abutment stop against a cabinet shelf when positioning the tool for face frame type hinge plate locating, with the templates lying against the edge of a face frame of a cabinet.

A still further object of the invention is that drawer guide hardware can be installed in base cabinets of varying depths, as the drawer guide does not have to extend to rows of attachment holes drilled in an equal distance from each edge of a cabinet partition.

Another object of the invention is that drawer height can vary to fit specific requirements, a drawer guide can be attached where needed, not just to rows of attachment hole equally spaced apart.

A further object of the invention is that door height can be varied to fit special requirements, as hinge mounting plates can be positioned where needed.

A still further object of the invention is the use of adjustable drill guide bushings in the hinge mounting plate template, to properly position the hinge mounting plate for different thicknesses of cabinet door materials, when doors are to be installed in a flush manner.

Another object of the invention is all templates may be used at one time or only one type of template may be used if desired.

A further object of the invention is the ease of rearranging templates on the channel guide members.

A still further object of the invention is that additional templates can be added to fit the requirements of a given user.

Another object of the invention is that any component of the tool is easily replaced.

A still further object of the invention is that the tool is portable.

Another object of the invention is the tool's efficiency.

A still further object of the invention is that the tool is inexpensive.

BRIEF DESCRIPTION OF THE DRAWINGS

Other objects and advantages of the invention will become more apparent from the specification taken in conjunction with the accompanying drawing in which.

DETAILED DESCRIPTION OF THE INVENTION

Figure 1:
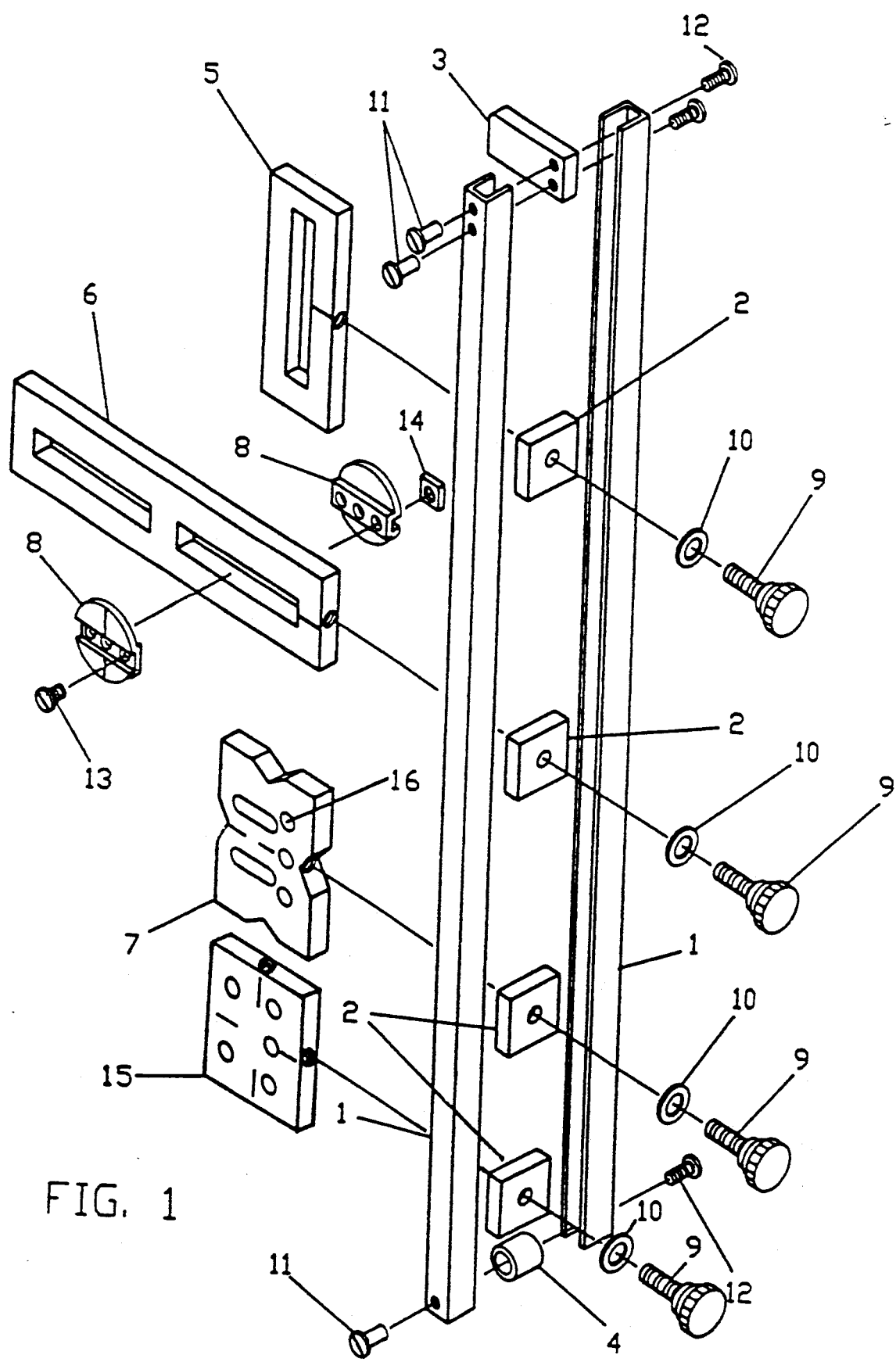
FIG. 1 is an exploded perspective view of the fastener locating device.

Referring to FIG. 1 numeral 1 designates the guide rail members, capturing the template abutment stop clamping washers 2, spacer and positioning foot 3, spacer 4, vertical mounting, adjustable bushing, with reference line template 5, horizontal mounting, adjustable bushing, with reference line template 6, adjustable bushing, fixed guide bushing, V notched and axial rotatable with reference line template 7, adjustable vix bit bushing with reference line 8, connecting fasteners 13 and 14, template intermittent clamping thumbscrew 9, washer 10, and the fixed guide holes are numbered 16. Template 15 has exclusively fixed guide holes.

Figure 2:
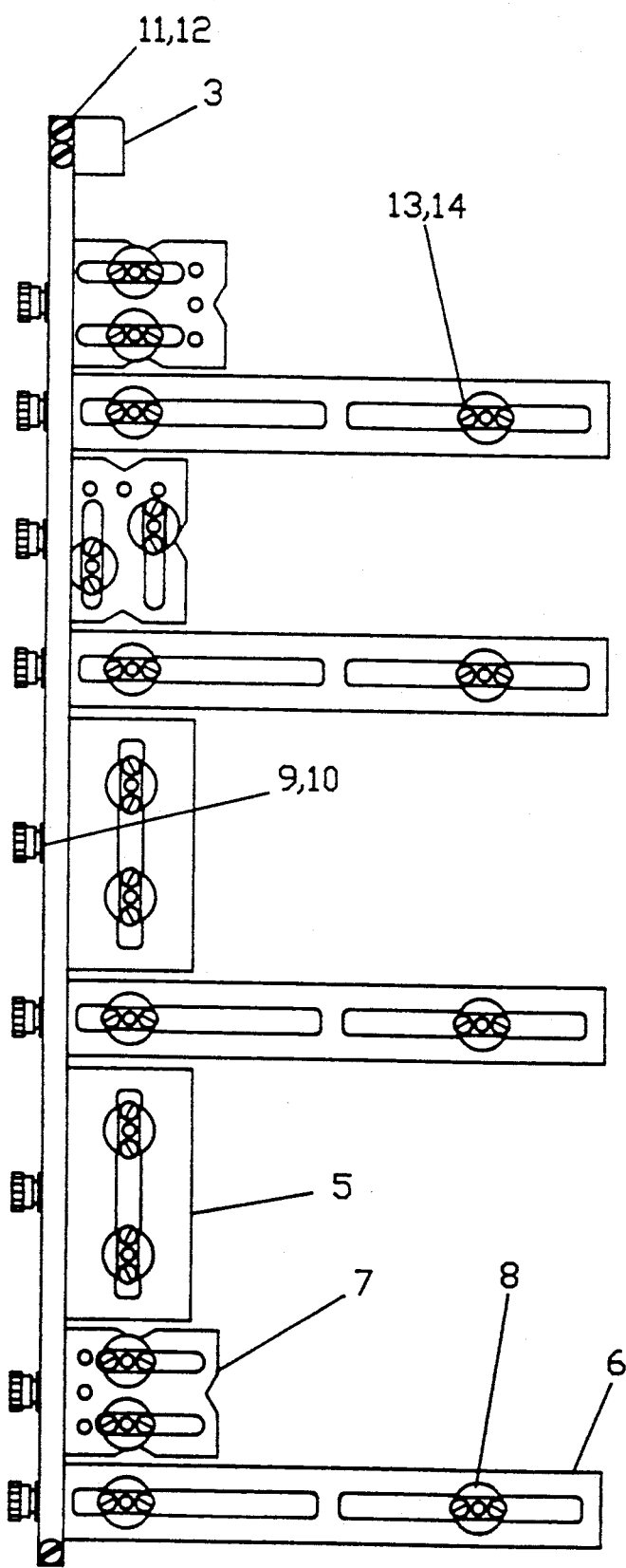
FIG. 2 is a side view of the fastener locating tool, showing the tool inverted, with a template acting as a device positioning foot.

FIG. 2 illustrates the side view of fastener positioning device with template 6, acting as the bottom positioning foot, complete with vix bit guide bushing 8, and fasteners 13 and 14, combination template 7, complete with vix bit guide bushing assemblies 8, 13 and 14, vertical mounted template 5, complete with vix bit guide bushing assemblies 8, 13 and 14, thumbscrew 9 and washer 10, footpiece 3, held in place by fasteners 11 and 12.

Figure 3:
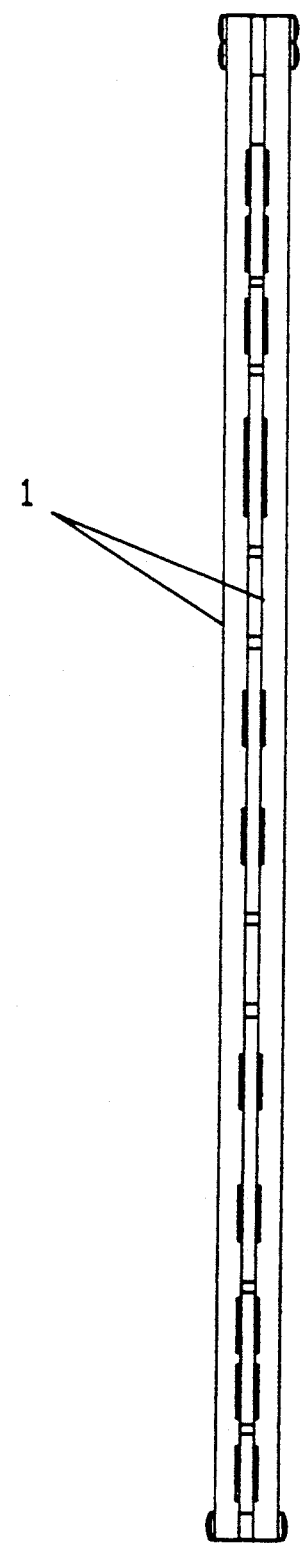
FIG. 3 is a front view.

FIG. 3 is a front view.

Figure 4:
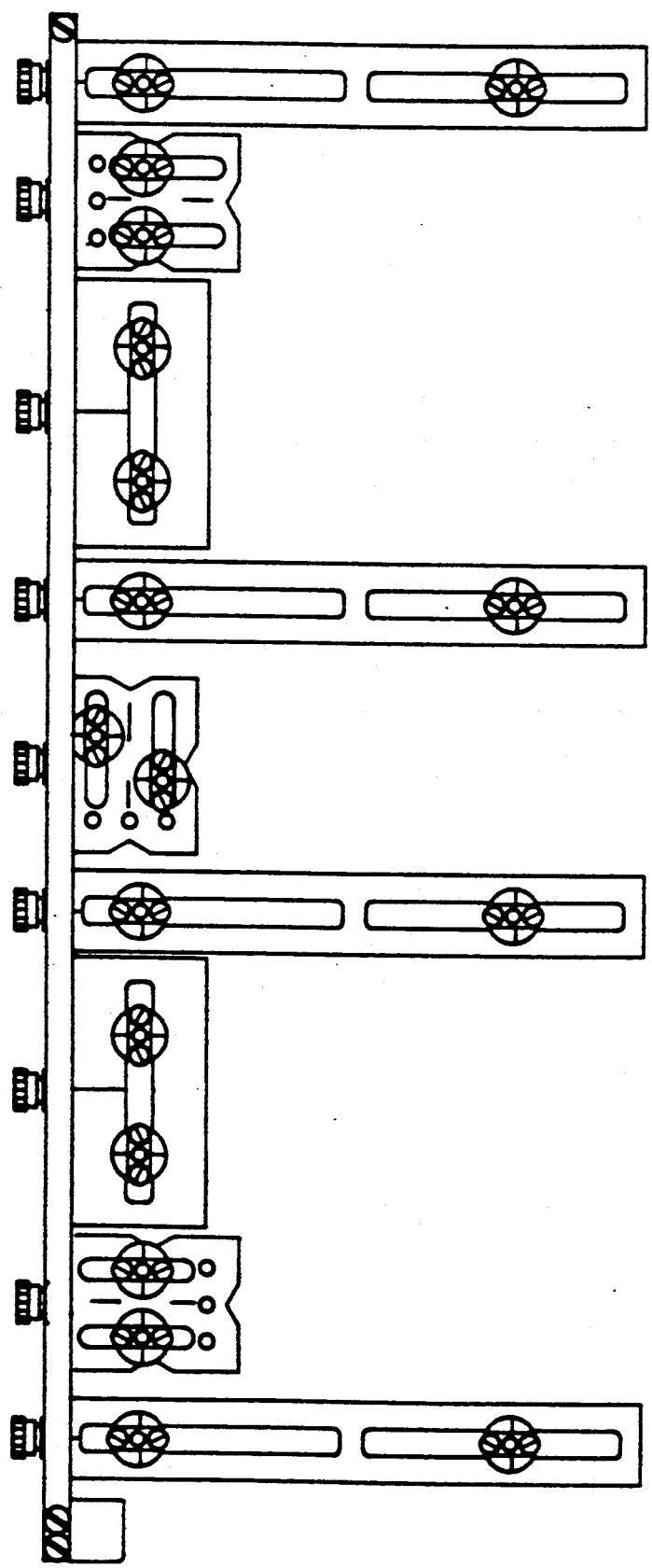
FIG. 4 is a side view of the fastener locating device, showing the various templates repositioned for a different usage, with the device bottom positioning foot in a down operating posture.

FIG. 4 is a side view of the fastener locating device with templates at various elevations in different operating postures, with the foot piece being used to position the fastener locating device.

I claim:

1. A hardware installation device for locating holes for hardware on a workpiece or cabinet carcass, said device comprising tow parallel guide rail members, said members being provided with fastener attachment means at each end, said members positioned apart by a spacing means at one end and a device positioning means on the opposite end, template positioning means adjustably movable between said guide rails, a plurality of templates for locating pilot holes for hardware attachment screws, each template having a plurality of edges and attachment means on one or more edges, clamping means on the template positioning means for engaging the attachment means such that the templates may be attached to the guide rails in a plurality of orientations, said templates provided with either (a) guide means to accept adjustable bushings, the bushings having fastener attachment means to secure the bushings in adjusted locations, said adjustable bushings and said templates being provided with reference lines for vertical and horizontal positioning, or (b) fixed guide holes to drill holes to duplicate conventional hardware locations, or (c) both fixed guide holes and adjustable bushings.

2. A hardware installation device for locating holes as set forth in claim 1, wherein said templates include v notch locating means.

* * * * *